United States Patent [19]
Klink

[11] Patent Number: 5,286,339
[45] Date of Patent: Feb. 15, 1994

[54] PROCESS AND APPARATUS FOR THE HERMETIC ADHESIVE BONDING OF PLASTIC CASING PARTS OF A BATTERY OR OF A GALVANIC CELL

[75] Inventor: Rainer Klink, Kernen, Fed. Rep. of Germany

[73] Assignee: Deutsche Automobilgesellschaft mbH, Stuttgart, Fed. Rep. of Germany

[21] Appl. No.: 819,196

[22] Filed: Jan. 13, 1992

[30] Foreign Application Priority Data

Jan. 12, 1991 [DE] Fed. Rep. of Germany ....... 4000781

[51] Int. Cl.⁵ ............................................. C09J 5/00
[52] U.S. Cl. ................... 156/308.6; 29/623.4; 156/69; 118/410
[58] Field of Search ............... 156/308.6, 69; 29/623.4, 623.2; 118/410

[56] References Cited

U.S. PATENT DOCUMENTS

| | | | |
|---|---|---|---|
| 1,008,628 | 10/1963 | Staude | 156/308.6 |
| 1,784,216 | 12/1930 | Aldrich et al. | 156/69 |
| 2,993,826 | 7/1961 | Mendelsohn | 156/331.8 |
| 3,053,609 | 2/1959 | Miller | 156/308.6 |
| 3,073,736 | 10/1955 | Lange | 156/308.6 |
| 3,224,411 | 12/1965 | Blaha et al. | 118/411 |
| 3,300,370 | 7/1965 | Epstein | 156/308.6 |
| 3,499,814 | 6/1967 | Bisell | 118/410 |
| 3,549,789 | 12/1970 | Haroldson | 156/308.6 |
| 3,873,400 | 3/1975 | Tsuchida et al. | 156/556 |
| 3,938,467 | 2/1976 | Radowicz | 156/578 |
| 4,102,304 | 7/1978 | Debenham | 118/410 |
| 4,698,116 | 10/1987 | Bassett et al. | 156/578 |
| 4,842,469 | 6/1989 | Schmidt | 118/410 |
| 4,863,792 | 9/1989 | Mrozinski | 156/308.6 |
| 5,039,370 | 8/1991 | Cesaroni | 156/308.6 |

FOREIGN PATENT DOCUMENTS

| | | | |
|---|---|---|---|
| 0210646 | 2/1987 | European Pat. Off. | 156/308.6 |
| 0038379 | 3/1979 | Japan | 156/308.6 |
| 0046858 | 3/1982 | Japan | 156/69 |
| 0210812 | 12/1982 | Japan | 156/308.6 |
| 0145058 | 8/1983 | Japan | 29/623.2 |
| 0158857 | 9/1983 | Japan | 29/623.2 |

OTHER PUBLICATIONS

"Taschenbuch der Kitte und Klebstoffe" pp. 190-191 328-329.

Primary Examiner—David A. Simmons
Assistant Examiner—Mark DeSimone
Attorney, Agent, or Firm—Evenson, McKeown, Edwards & Lenahan

[57] ABSTRACT

A process and apparatus for the hermetic adhesive bonding of plastic casing parts of a battery or of a galvanic cell. The casing comprises a plastic casing container and a top or bottom of the same type of plastic, preferably of polyamide, which are adhesively bonded to each other by means of a pair of joining surfaces. For adhesive bonding, the joining surface of one of the two parts is wetted at specific locations with a solvent dissolving the plastic, preferably with formic acid, over a time period of 5 to 7 seconds. The joining surface is aired at room temperature in still air over a time period of about 15 to 25 seconds, and the casing parts are then joined to each other and pressed together with pressure maintained over a time period of about to 5 to 10 minutes.

8 Claims, 2 Drawing Sheets

PROCESS AND APPARATUS FOR THE HERMETIC ADHESIVE BONDING OF PLASTIC CASING PARTS OF A BATTERY OR OF A GALVANIC CELL

BACKGROUND AND SUMMARY OF THE INVENTION

The present invention relates to a process for the hermetic adhesive bonding of plastic casing parts of a battery or of a galvanic cell.

German book publication: "Taschenbuch der Kitte und Klebstoffe" (Pocketbook of cements and adhesives), Dr. E. Plath, L. Plath; Wissenschaftliche Verlagsgesellschaft mbH, Stuttgart (1963), pages 328-29, describes a process for adhesive bonding of plastic parts made from polyamide, in which the joining surfaces of the parts are thinly coated with formic acid, dried slightly and then pressed together, as well as an apparatus for carrying out the process. In some cases of batteries or galvanic cells, however, it is necessary to keep the leakage rate of the adhesion very low. For instance, in the case of gas-tight nickel/cadmium cells with oxygen consuming electrodes, it is necessary to achieve a tightness which allows a leakage rate of no more than $10^7$ mbar$\times$liter per sec. (referred to as 50 mbar helium), in order to ensure a service life of many years. Otherwise, the ingress of the nitrogen contained in the atmosphere would considerably impair the gas kinetics, and consequently the functioning of the cell.

Since polyamide 6 is generally used as plastic for the casing, it is usual to seal such a gas-tight cell by diffusion bonding by means of formic acid. This type of bonding, and design tips for the bonding seam, are described in VDI codes of practice; "Kunststoffkleben" (adhesive bonding of plastics); VDI 3821. Generally, quite good results are obtained in such adhesive bonding of the cell casing, but there is a relatively high rejection rate with respect to the required tightness due to the partial dissolution of the polyamide 6 by the formic acid, which causes the formation of many small gas passages in the region of the joining surfaces (microporosity) thereby increasing gas permeability. Moreover, the application of the adhesive solution, which is toxic and very aggressive, is complicated, time-consuming and thus expensive.

The object of the present invention is to develop a process by which the rejection rate is lowered and the adhesive bonding is made easier in terms of the process and in terms of design.

This object is achieved by the process according to the invention, in which the plastic casing of the future battery or galvanic cell is produced in an efficient way, the bonding region having a low to insignificant microporosity. As a result, on the one hand the rejection rate is lowered in production and on the other hand the tightness of the bond is ensured.

Other objects, advantages and novel features of the present invention will become apparent from the following detailed description of the invention when considered in conjunction with the accompanying drawings.

DETAILED DESCRIPTION OF THE DRAWINGS

Since adhesive bonding of the cell casing involves thin-walled plastic parts which should also be smooth and clean on the outside and inside, it is beneficial to design the joint between the casing container 1 and bottom or top part (referred to hereinafter as bottom 2), taking into consideration the potential for injection molding.

Figure 1:
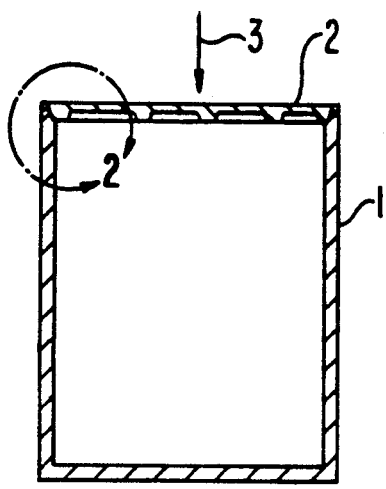
FIG. 1 shows a battery casing with an inserted bottom.
Figure 2:
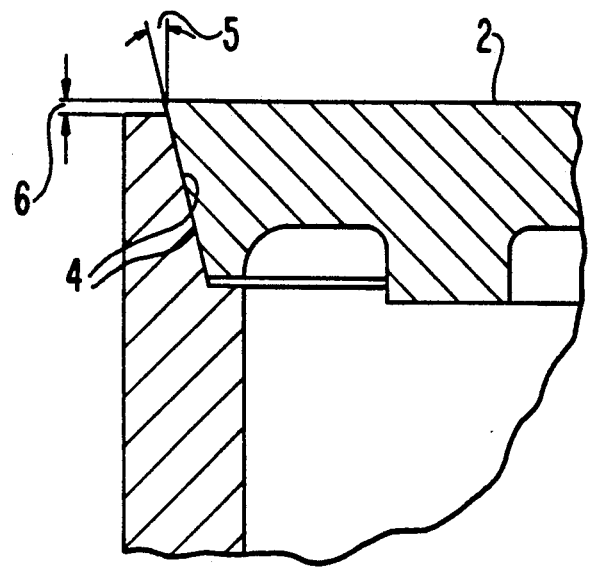
FIG. 2 shows a cutout of a corner of the casing according to FIG. 1.

The configuration of such an improved casing container/bottom joint is shown in FIG. 1. The bottom 2 is bevelled towards the inside of the casing along its outer periphery in the manner of a truncated pyramid (as shown in FIG. 2), which causes the bottom 2 to center itself within the associated open end face of the casing container 1 (provided with correspondingly counter-profiled joining surfaces 4) and also helps to achieve a good bonding seam. A joining angle 5 between the outer periphery of the bottom 2 and the insertion direction 3 of between 5° and 25°, in particular between 10° and 15°, is especially advantageous. That is, if the joining angle 5 is smaller, the parts may not be pressed against each other strongly enough and, if it is too large, the bottom 2 may protrude undesirably beyond the casing rim or the casing rim may bulge out.

For the adhesive, it has proven advisable to use technically pure formic acid, which dispenses with the laborious preparation of a solution and permits satisfactory adhesive bonding and a shorter curing time. In order to achieve a smooth transition of the bonded bottom 2 on the end face of the casing container 1, before the partial dissolution of the joining surfaces 4 of the bottom 2, the bottom 2 has a slight vertical oversize 6 with respect to the joining surfaces 4 of the open end face of the casing container 1.

The adhesive bonding of the bottom 2 to the casing container 1 may be performed in an apparatus such as that represented in FIGS. 4a-4h, which also illustrate the sequence of the process. A casing holder 10, is provided for precisely holding the casing container 1, with an immersion tank 7 for the bottom 2 to be wetted, a metering pump 14, fluid-connected to the immersion tank 7 via a supply channel 12 and drainage channel 16, as well as a pneumatically operated bottom gripper 11, which is arranged along a center axis of the casing holder 10, and can be moved axially.

Figure 4A:
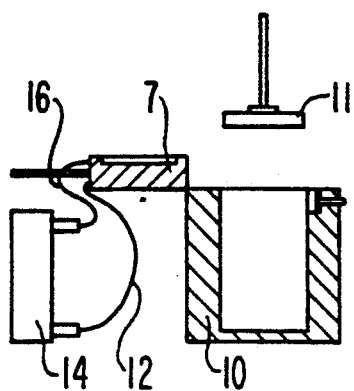
FIGS. 4a-4h show an apparatus for carrying out the process in various stages.

With the above apparatus, the process according to the invention is performed as follows. FIG. 4a shows the apparatus in the starting position, i.e., the vessel holder 10 is empty, the immersion tank 7 is retracted transversely to the lifting direction of the bottom gripper 11 and the metering pump 14 is not delivering any formic acid into the immersion tank 7.

Figure 4B:
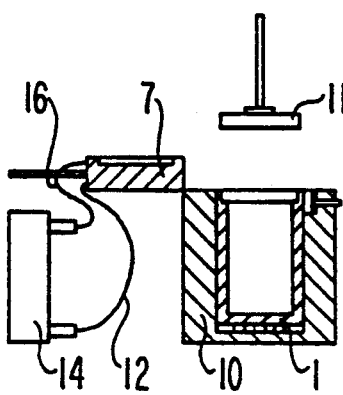
Figure 4C:
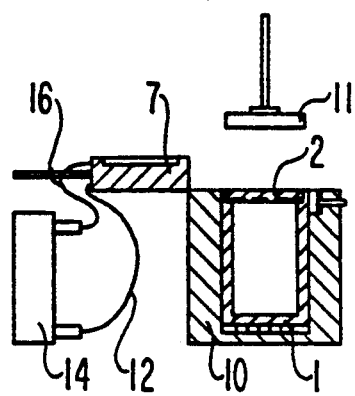
Figure 4D:
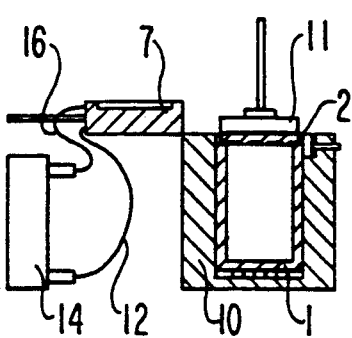
Figure 4E:
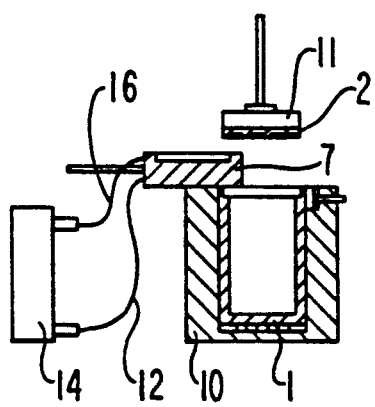
Figure 4F:
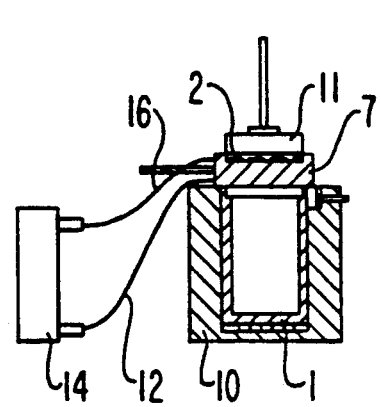

As shown in FIG. 4b, the casing container 1, in which all the necessary parts of the cell are preassembled, is placed into the casing holder 10 with its open end face upwards and with the pole bolt downwards, and is supported from the outside. Bottom 2 is then placed freely against or in the open end face of the casing container 1, centering itself with respect to the casing container 1 by virtue of its bevelled outer walls. (See FIG. 4c.) The bottom gripper 11 then lowers onto the bottom 2 under pressure, and grips it by means of vacuum suction fittings on the underside of the bottom gripper which cling to the outer surface of the bottom 2. A spring-loaded double pneumatic cylinder (not shown) serves as vacuum pump.

Figure 3:
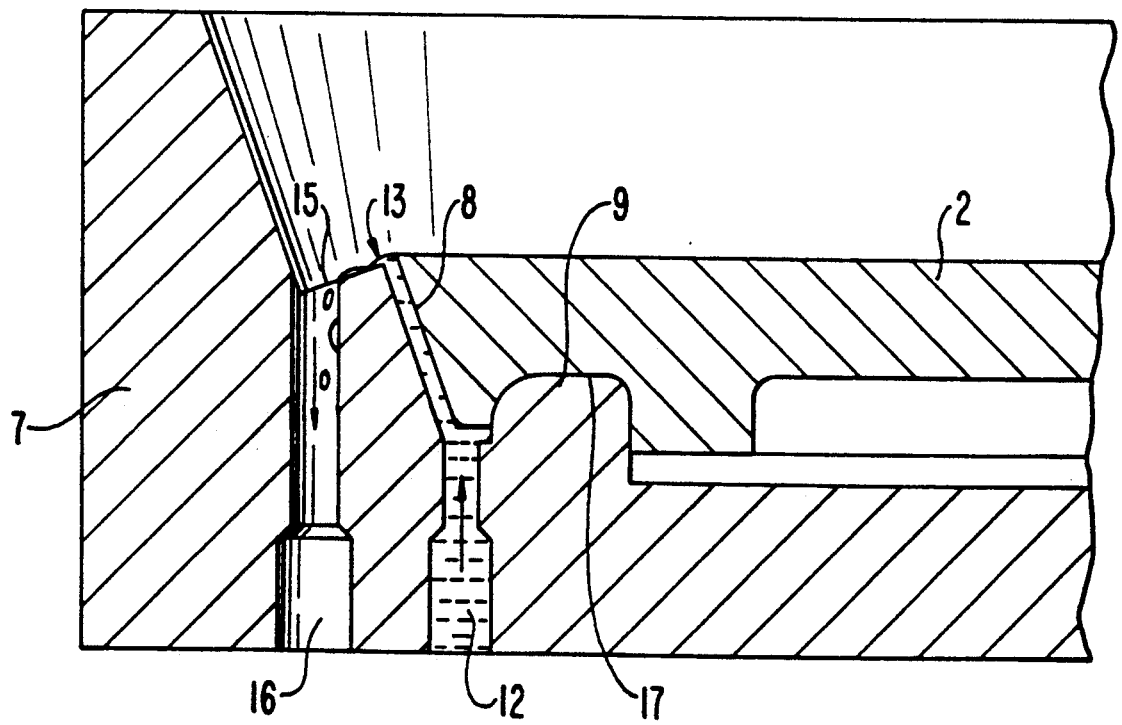
FIG. 3 shows a cutout enlargement of the bottom placed in an immersion tank.

Once the bottom 2 has been gripped the bottom gripper 11, the bottom gripper 11 retracts to its starting position (FIG. 4e), and the immersion vessel 7 is moved transversely to the lifting direction of the bottom gripper 11 into the region directly above the open end face of the casing holder, where it is aligned in a defined position. Next, the bottom gripper 11 moves downwards and presses the bottom into the bottom of the immersion vessel 7. (See FIG. 4f). The depth of insertion of the bottom 2 into the immersion vessel 7 is limited by stopping means 17 acting in the axial direction as shown in FIG. 3. The bevelled outer periphery of the bottom 2 (peripheral joining surface 4) is thereby inserted into the inner wall of the immersion vessel 7 which has a similar contour. A sealing bead 9 of the immersion vessel 7 serves as stopping means 17, and also seals off the inner surface of the bottom 2 from an immersion channel 8 formed between the outer walling of the bottom 2 and the inner walling of the immersion vessel 7 in the region of the joining surfaces 4.

With the bottom pressed against sealing bead 9 to form a seal, the metering pump 14 is actuated and the formic acid flows through the supply channel 12 into the immersion channel 8 which has a smaller width than the diameter of the supply channel 12. The joining surface 4 of bottom 2 is thereby wetted with formic acid. The metering pump 14 is rated, for example, such that only the supply channel 12 is fully filled, and the immersion channel 8 is partly filled. The surface tension of the formic acid, however, ensures complete wetting of the joining surface 4 of the bottom 2. In the present case, the immersion vessel 7 has along its rim an overflow edge 13, the vertical extent of which is lower than the upper surface of the placed-in bottom 2. As a result, the wetting process is restricted to the joining surfaces 4, with overflowing formic acid flowing off via a collecting channel 15 arranged outside the overflow edge 13, into the drainage channel 16. (See FIG. 3 and FIG. 4f.) After a wetting time of about 5 to 10 seconds, the metering pump 14 sucks the formic acid out the immersion channel 8 virtually instantaneously.

Figure 4G:
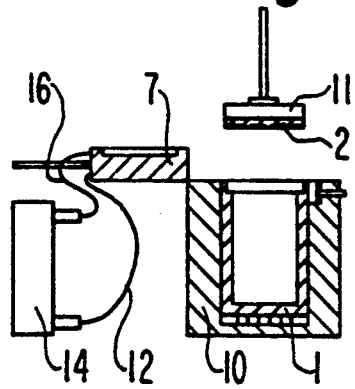

After completion of the wetting operation, the bottom gripper 11 moves upwards, withdrawing the wetted bottom 2 with it (see FIG. 4g). Thereafter, the immersion vessel 7 retracts into its starting position and the bottom 2 is held in the upper position of the gripper 11 until an airing time of about 15 to 30 seconds has elapsed. During this time adhering formic acid diffuses into and partially dissolves the joining surfaces 4 of the bottom 2, with excess formic acid evaporating.

Figure 4H:
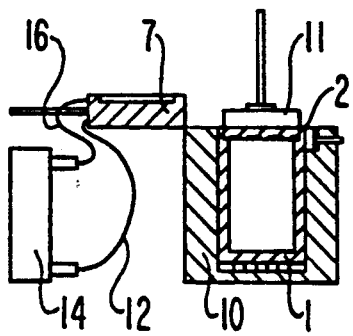

Once this airing time has elapsed, the bottom gripper 11 moves downward and presses the bottom 2, wetted only on its joining surfaces 4, into the corresponding joining surface 4 of the casing container 1 (see FIG. 4h). The bottom gripper 11 remains in this position during the curing time of about 5 to 20 minutes. Due to the force with which the bottom is pressed (about 10 N/mm²), there is very good contact of the joining surfaces 4 to be adhesively bonded, so that an excellent diffusion bonding occurs. Moreover, due to the small amount of formic acid, only a small partly dissolved zone is produced, and consequently the basic structure, and thus the permeation behavior, of the material is scarcely changed. Therefore, it becomes technically important for the process to maintain the parameters of wetting time, airing time and curing time, as well as the pressing pressure, all of which are satisfactorily ensured by the apparatus described. Control of the process may be implemented automatically or all operations can also be initiated manually. It is advisable that the entire apparatus be operated by just one type of energy, compressed air being particularly advantageous.

The following optimum conditions for good adhesive bonding have been established by tests:
Joining angle 12° to 15°
Projection before bonding 0.3–0.5 mm
Wetting 5–7 seconds
Airing 15–25 seconds
Curing 5–10 minutes Furthermore, for favorable adhesive bonding it must be ensured that the individual operations are performed immediately one after the other. The following ratio between the individual times may be given as a good guide:
Wetting:Airing:Curing as 1:4:20.

Furthermore, because formic acid is toxic and very caustic, and moreover has a relatively high vapor pressure, it is advisable when dimensioning the immersion channel 8 to ensure that it has as small a volume as possible, and as small an evaporative surface area as possible.

Apart from the specific parameters given for formic acid, both the process and the apparatus can also be used for the adhesive bonding of other plastics.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Process for the hermetic adhesive bonding of plastic casing parts for a battery, said casing parts comprising a cup-shaped casing container having an opening therein and a closure part having a size and shape corresponding to size and shape of said opening, both of said casing container and said closure part being made of a plastic material and being bonded to each to her along respective joining surfaces at peripheries of said opening of said casing container and said closure part, said joining surfaces being inclined at an angle of approximately 12° to 15° relative to a plane of said opening, said method comprising the steps of:
wetting said joining surface of one of said casing container and said closure part, for a time period which is in a range of from 5 to 7 seconds, with an agent which dissolves said plastic material;
airing said joining surface at room temperature in still air for a time period which is in a range of from 15 to 25 seconds;
placing said closure part into said opening; and
applying pressure to said closure part so that said joining surfaces of said closure part are pressed against said joining surfaces of said casing container for a time period which is in a range of from 5 to 10 minutes;
wherein said wetting step comprises the steps of:
inserting one of said joining surfaces in an immersion vessel;

forming an immersion channel between said joining surface and an inner wall of said immersion vessel; and flowing said agent through said immersion channel parallel to and between said joining surfaces.

2. Process according to claim 1 wherein said plastic is polyamide 6.

3. Process according to claim 1 wherein said pressure is approximately 10 N/mm$^2$.

4. Process according to claim 1 wherein said pressing step is performed at room temperature.

5. Process according to claim 1 wherein the ratio between wetting time, airing time and pressing time is approximately 1:4:20.

6. Process according to claim 1 wherein an outer surface of said closure part projects out of said opening of said casing container by a distance which is in a range of approximately 0.3 to 0.5 mm when said closure part is placed in said opening without application of pressure.

7. Process according to claim 1 wherein an outer surface of said closure part projects out of said opening of said casing container by a distance which is in a range of approximately 0.3 to 0.5 mm when said closure part is placed in said opening without application of pressure.

8. Process according to claim 1 wherein the joining surface is wetted by rinsing with said agent.

* * * * *